(12) United States Patent
Marupaduga

(10) Patent No.: US 11,297,484 B1
(45) Date of Patent: Apr. 5, 2022

(54) DYNAMIC ANCHOR ASSIGNMENT USING SECTOR POWER RATIO

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/075,361

(22) Filed: Oct. 20, 2020

(51) Int. Cl.
*H04W 8/02* (2009.01)
*H04W 64/00* (2009.01)
*H04W 84/04* (2009.01)

(52) U.S. Cl.
CPC ............. *H04W 8/02* (2013.01); *H04W 64/00* (2013.01); *H04W 84/042* (2013.01)

(58) Field of Classification Search
CPC ...... H04W 8/02; H04W 64/00; H04W 84/042
See application file for complete search history.

(56) References Cited

U.S. PATENT DOCUMENTS

| | | | | |
|---|---|---|---|---|
| 10,321,334 B1 * | 6/2019 | Marupaduga | ......... | H04W 16/30 |
| 11,129,069 B1 * | 9/2021 | Marupaduga | ......... | H04W 36/06 |
| 2013/0308473 A1 * | 11/2013 | Sun | ....... | H04W 36/30 370/252 |
| 2015/0181596 A1 * | 6/2015 | Sridharan | ........... | H04W 72/085 455/450 |
| 2015/0195001 A1 * | 7/2015 | Barker | ................ | H04B 7/0617 342/367 |
| 2019/0261198 A1 * | 8/2019 | Sarkar | .................. | H04J 11/0079 |
| 2020/0044362 A1 * | 2/2020 | Song | ..................... | H01Q 19/10 |
| 2020/0083971 A1 * | 3/2020 | Zhong | .................. | H04B 7/0695 |
| 2021/0257720 A1 * | 8/2021 | Wan | ..................... | H01Q 21/068 |

* cited by examiner

*Primary Examiner* — Khawar Iqbal

(57) ABSTRACT

Systems and methods herein disclose determining anchor assignment for one or more user devices (UE). The system comprises at least a first node and a second node, each of the first and second nodes are configured to wirelessly communicate with one or more UEs in a geographic service area. The system determines a sector power ratio for the first node and the second node; determines that at least one node has a SPR value above a predetermined threshold, and then receives historical data for the first node and this second node. Based on the historical data received, a physical cell identification (PCI) value is determined for each node and the node with the lower PCI frequency change from a UE perspective is assigned as the anchor node for one or more UEs. In additional aspects, a frequency band is also assigned based on SPR.

20 Claims, 7 Drawing Sheets

US 11,297,484 B1

DYNAMIC ANCHOR ASSIGNMENT USING SECTOR POWER RATIO

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

The present disclosure is directed, in part, to dynamically determining anchor assignment for one or more user devices by employing sector power ratio (SPR) information to dynamically combat the negative impacts of noise and interference at a cell site and utilizing SPR information to determine the anchor assignment. In aspects, it is determined that the SPR value for either a first node or a second node is greater than a pre-determined threshold. Based upon this determination, historical data is received for each node and a physical cell identification (PCI) is determined for each node based on the historical data. The node with the lower PCI frequency change from a user device's perspective is then assigned as the anchor for one or more user devices.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
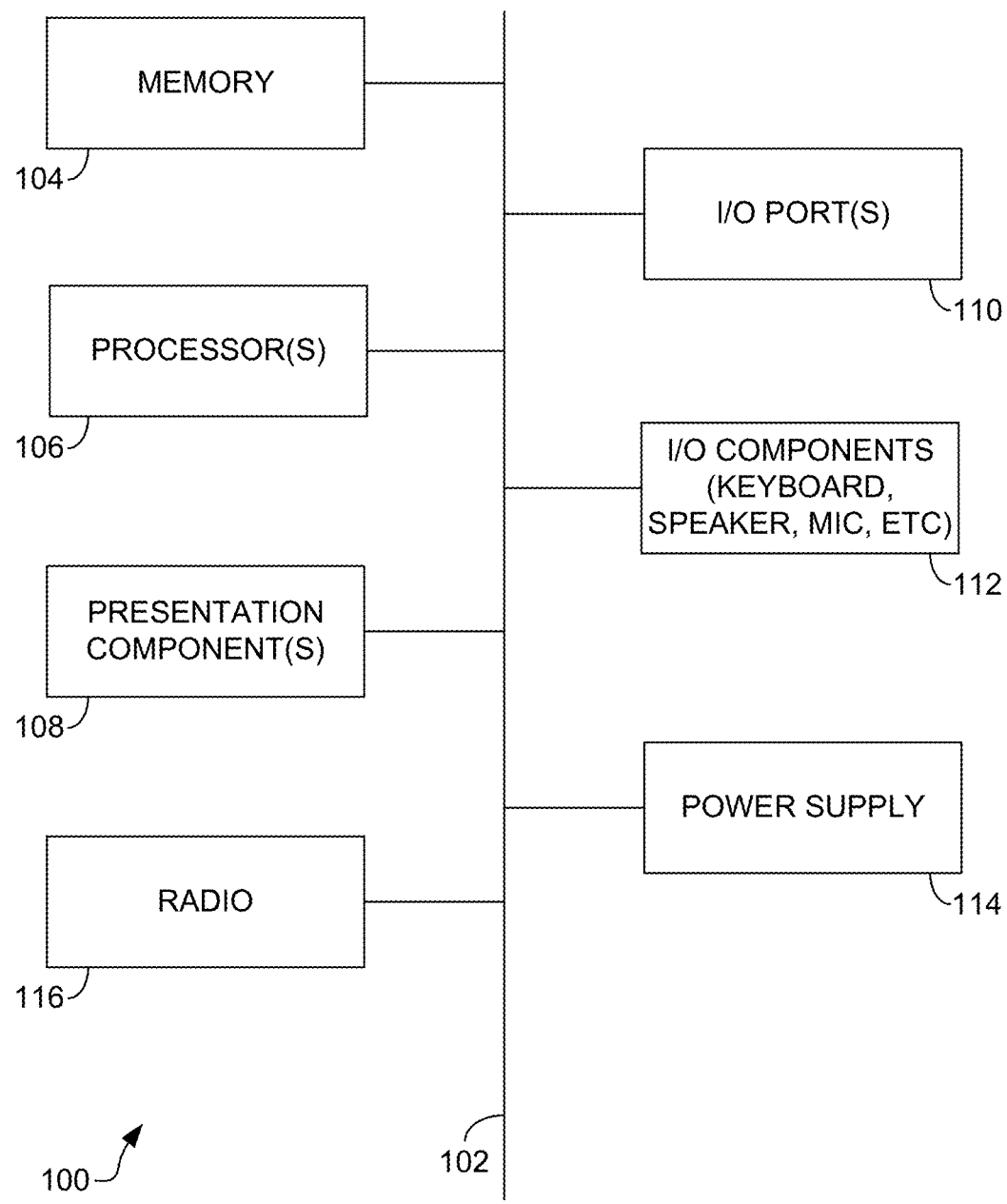
FIG. 1 depicts a diagram of an exemplary computing environment suitable for use in implementations of the present disclosure.

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a UE (e.g., a UE) to access one or more network services. In some cases, the desired network service may be a telecommunication service. In conventional systems, the UE may communicate with the cell site and request or indicate that UE prefers to connect with the cell site on a specific frequency band with a lower latency and a higher speed compared to other available frequency bands. For example, in conventional systems, the UE automatically connects to 5G when in range of both 5G and 4G. As another example, in conventional systems, the UE automatically connects to 5G when connected to 4G and subsequently comes within range of 5G. In such conventional systems, the cell site or network automatically initiates access and communication with the UE over the largest bandwidth channel. Unfortunately, these conventional systems do not always select the best available channel as the EN-DC anchor and resource block allocation and UE performance suffers.

With the increase in use of Massive-MIMO (MU-MIMO) as opposed to traditional antenna arrays, there is an increase in the number of antenna elements compared to the traditional antenna arrays. For example, MU-MIMO antenna arrays may comprise 64 elements while traditional antenna arrays may have only included 8 or 16 elements. While the technological advances provide numerous advantages for wireless telecommunications, it creates challenges related to key performance indicators, including interference and diminishing channel quality. One challenge arises with antenna sector power ratio. Antenna sector power ratio (SPR) is defined as a measure of an antenna's ability to minimize interference. It is an expression of RF power radiated outside a sector versus the RF power radiated and retained within the sector. Generally, a low SPR value is about 2-4% while a high SPR value might be 8% or more. As antenna arrays become more sophisticated and use more and more elements, it results in greater challenges with maintaining desired signal levels, which leads to higher SPR values and more interference. As such, it is an objective of the present disclosure to provide systems and methods which incorporate dynamic mechanisms to optimize user experiences based on SPR determinations.

Additionally, the manner in which these conventional systems are configured results in ping-ponging. Ping-ponging occurs when a UE is assigned to one anchor, then handed over to another anchor, and then back again quickly. This causes unnecessary signaling. In a cellular network, ping-pong handover is a very common phenomenon that degrades the network performance since the ping-pong handover increases the times of handover and thus the loading of the network. Additionally, ping-ponging between sectors of UEs causes high interference which negatively impacts battery life. As such, it is necessary for network operators to reduce this undesirable effect. However, the conventional technology does not provide a systematic and objective solution for the operators to find the cell pair suffering from the ping-pong effect, so it depends on the subjective experience of the operators or the try-and-error way to handle this problem. Usually, this approach would cause inefficiency and failure.

Currently, to decrease the issue, UEs located within the range of more than one cell site will automatically attach to the LTE network. Then, the UE may attach to a second site, such as a 5G network. This combination of frequencies utilizes more resources and lacks efficiency. As such, there is a need for systems in which, based on the SPR determination, a node with lower SPR is assigned as the anchor node. For example, in a situation where there are three potential anchor sites available, site 1, site 2, and site 3, the site to be assigned as the anchor is based upon the SPR value determination rather than simply location to decrease the ping-pong effect.

The systems and methods provided herein can alleviate one or more of the problems discussed above. To alleviate the issues caused by the ping-pong effect and high SPR, assigning a node that has a lower SPR value may be desirable. At a high level, systems, methods, and computer-readable media of the present invention employ sector power ratio (SPR) information, which describes the radio frequency power that is radiated outside of an antenna array's sector relative to the radio frequency power that is radiated and retained within the antenna array's sector, to dynamically combat noise and interference at a cell site. The negative impacts caused by high-powered undesired RF radiation at a cell site may be reduced or mitigated by reducing the number of users assigned to communicate with the wireless antenna array using a particular wireless communication protocol. In particular, a wireless communication protocol with a high SPR and key performance indicators that exceed threshold values may have limits placed such that the number of users is limited to improve performance for those using that particular wireless communication protocol.

To resolve this issue, in one aspect, a system disclosed herein can determine anchor assignment for one or more UEs utilizing SPR values. The system may comprise one or more nodes, each of the one or more nodes configured to wirelessly communicate with one or more UEs in a geographic service area. The system may further comprise one or more processors configured to perform operations. The operations may include determining the SPR for a first node and a second node. Then, based on determining that the SPR value is above a threshold for at least one of the nodes, the system may receive historical data for the first node and the second node. A PCI frequency change for the first node and the second node are determined based on the historical data received and then the node with the lower PCI frequency change ("PCI value") from a UE perspective is assigned as the anchor for the one or more UEs. In aspects discussed herein, when the term PCI value is referred to, it is meant as the PCI frequency change over a predetermined time period. When the PCI frequency change is high, it correlates to a UE that is frequently connecting, disconnecting, and reconnecting to one or more nodes which will cause interference, ping-ponging, and diminish the wireless communication session. By contrast, a low PCI frequency change correlates to low or no ping-pong effect and is thereby favorable. As such, it is favorable to assign the node with the lower PCI frequency change as the anchor for one or more UEs.

In a second aspect, another system for dynamically determining an anchor assignment for one or more UEs is disclosed. In this aspect, the system comprises at least a first node and a second node, each of the first node and the second node are configured to wirelessly communicate with one or more UEs in a geographic service area. The system also comprises a first frequency band assigned to a first wireless communication protocol and a second frequency band associated with a second wireless communication protocol, each of the first frequency band and the second frequency band utilized for wireless communication with the one or more UEs in the geographic area. Additionally, the system comprises one or more processors configured to perform several operations. The one or more processors determine a location within the geographic area associated with the one or more UEs and then determine that at least one UE is in an undesired location. Then, a SPR value is calculated for the first node and the second node and for the first frequency band the second frequency band. The system may determine that at least one of the first node and the second node has a SPR value above a threshold and as a result, receives historical data for the first node and the second node. Additionally, the system continues by calculating a PCI value for the first node and the second node based on the historical data received. Then, the system will dynamically assign the node with the lower PCI value as an anchor for at least one of the one more UEs. Additionally, the system will also assign at least one of the one or more UEs to the frequency band with the lower SPR value.

In another aspect, a method for dynamically determining an anchor assignment for one or more UEs is disclosed. First, a location within a geographic area of one or more UEs is determined. Then, a sector power ratio (SPR) for a first node and a second node and the SPR for a first frequency band and a second frequency band is calculated. Continuing, at least one of the first node and the second node is determined to have a SPR value above a threshold. In response to determining that at least one of the first node and the second node have a SPR above a threshold, historical data for the first node and the second node is received. Based upon the historical data received, a PCI value for the first and second node are calculated. Following this, the node with the lower PCI value is dynamically assigned as an anchor for at least one of the one or more UEs. Additionally, at least one of the UEs is dynamically assigned to the frequency band with the lower SPR value.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other UE, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, processor(s) 106, radio(s) 116, power supply 114, input/output (I/O) component(s) 112, I/O port(s) 110, and presentation component(s) 108. Bus 102 represents what may be one or more busses (such as an address bus, data bus, or combination thereof). Although the UEs of FIG. 1 are shown with lines for the sake of clarity, in reality, delineating various components is not so clear, and metaphorically, the lines would more accurately be grey and fuzzy. For example, one may consider a presentation component such as a display device to be one of I/O component(s) 112. Also, processors, such as the processor(s) 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Additionally, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes processor(s) 106 that read data from various entities such as bus 106, memory 104 or I/O component(s) 112. Presentation component(s) 108 presents data indications to a person or other device. Exemplary presentation component(s) 116 include a display device, speaker, printing component, vibrating component, etc. I/O port(s) 110 allow computing device 100 to be logically coupled to other devices including I/O component(s) 112, some of which may be built in computing device 100. Illustrative I/O component(s) 112 include a microphone, joystick, game pad, satellite dish, scanner, printer, wireless device, etc.

Radio(s) 116 represents a radio that facilitates communication with a wireless telecommunications network. In aspects, the radio(s) 108 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio(s) 108 might additionally or alternatively facilitate other types of wireless communications including Wi-Fi, WiMAX, LTE, or other VoIP communications. As can be appreciated, in various embodiments, radio(s) 108 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
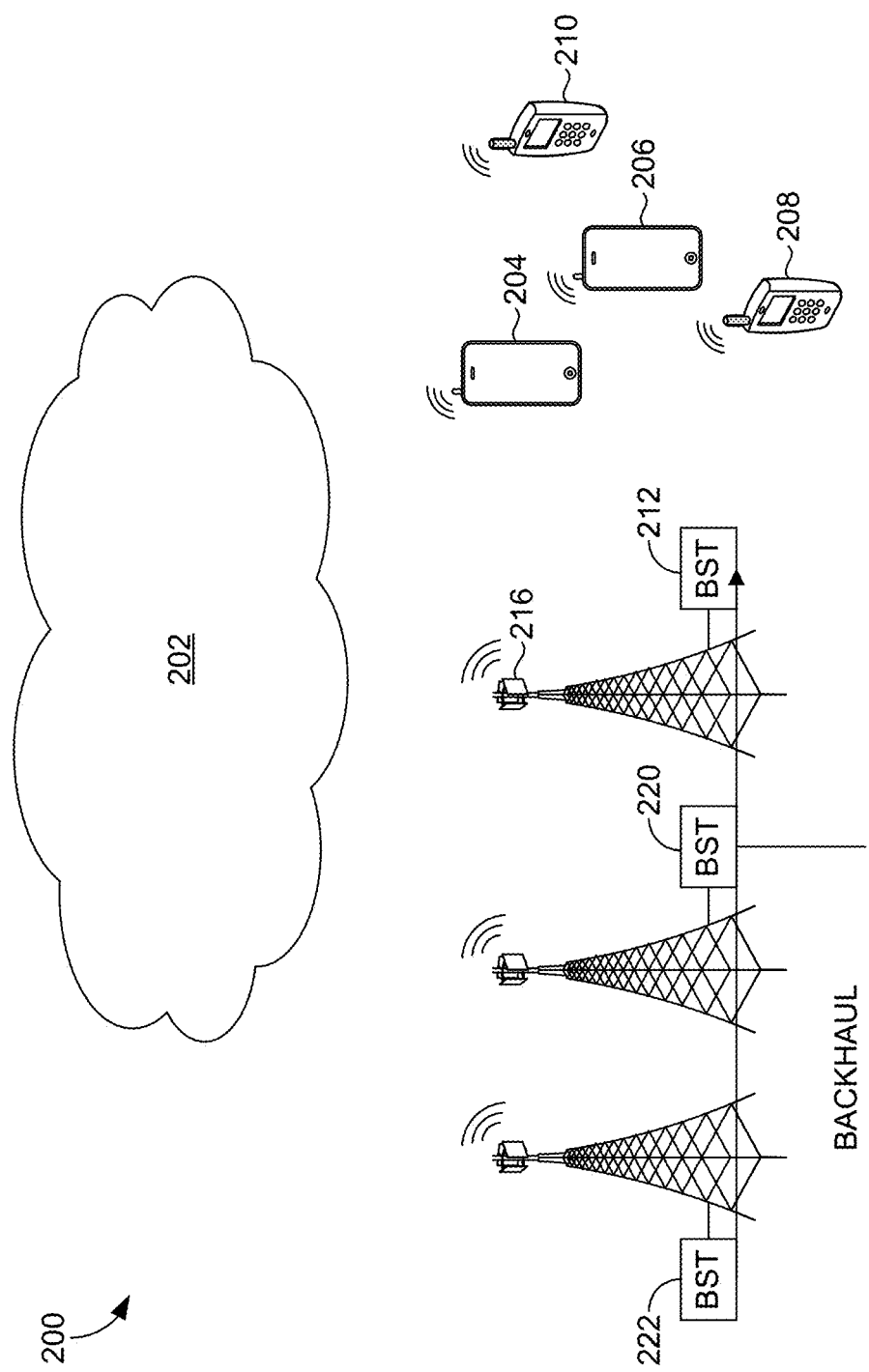
FIG. 2 illustrates an exemplary network environment in which implementations of the present disclosure may be employed.

Next, in FIG. 2, an example of a network environment 200 suitable for use in implementing embodiments of the present disclosure is provided. The network environment 200 is but one example of a suitable network environment and is not intended to suggest any limitation as to the scope of use or functionality of the disclosure. Neither should the network environment 200 be interpreted as having any dependency or requirement relating to any one or combination of components illustrated.

The network environment 200 includes a network 202 that provides service to current UE 204 and 206 and one or more legacy UE 208 and 210. The network 202 may be accessible through a base station 212 that is connected to a backhaul server (not shown). The base station 212 and/or a computing device (e.g., whether local or remote) associated with the base station 212 may manage or otherwise control the operations of components of a cell site, including an antenna array 216. The base station 212 and/or the computing device associated with the base station 212 may include one or more processors and computer-readable storage media having computer-executable instructions or computer instruction modules embodied thereon for execution by one or more processors.

The antenna array 216 may radiate in a particular direction and thus may correspond to a particular sector of a cell site. The antenna array 216 may have a plurality of antenna elements, in embodiments. In one embodiment, the antenna array 216 is configured to have a plurality of elements that in number, arrangement, and/or density, are configured for mMIMO. In one such embodiment, the base station 212 may include a radio and/or a controller, such as a Massive Multiple-Input Multiple-Output Unit for controlling a mMIMO configured antenna array, such as the antenna array 116 having a plurality of antenna elements. The base station 212 may use the controller to monitor one or more of throughput, signal quality metrics (e.g., SINR), a quantity of unique users/subscribers, a quantity of unique UE(s), and/or remote location filings that occur at the base station, all of which may be monitored dynamically and/or as stored in a data store.

The base station 212 may use a radio that is connected to the antenna array 216 by a physical RF path, where the radio is used to cause the antenna array 216 to transmit radio-frequency signals using the plurality of antenna elements. The plurality of antenna elements in the antenna array 216 may include portions of antenna elements (not shown). In embodiments, the plurality of antenna elements of the antenna array 216 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 216 operates in a dual technology mode.

In some embodiments, the antenna array 216 is partitioned such that the first portion of antenna elements is associated with the first access technology and the second portion of antenna elements is associated with the second access technology. When the antenna array 216 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 212 may provide current UE 204 and 206 and legacy UE 208 and 210 with access to the network 202, in embodiments. In some embodiments, the first portion of antenna elements may communicate with current UE 204 and 206 using 5G technology, and the second portion of the antenna elements may communicate with legacy UE 208 and 210 using 4G technology. When operating in the dual technology mode, the antenna array 216 may concurrently connect to and communicate with the current UE 204 and 206 and legacy UE 208 and 210 using, respectively, at least two distinct access technologies.

Accordingly, in one example, when the antenna array 216 is operating in the dual technology mode, the base station 212 concurrently acts an eNodeB (or "eNB") and gNodeB (or "gNB"). As such, the base station 212 may provide service to one or more access technologies to both current and legacy UE. In addition to communicating with the current UE 204 and 206 and the legacy UE 208 and 210, the base station 212 may also communicate with one or more neighboring base stations. In some embodiments, the base station 212 may communicate with neighboring base station 220 using the first access technology and may communicate with another neighboring base station 222 using the second access technology. For example, because the base station 212 may operate concurrently as an eNodeB and a gNodeB using the antenna array 216 that is partitioned and operating in a dual technology mode, the base station 212 may communicate with other base stations, for example, including legacy base stations that cannot use current access technologies (e.g., 5G) or current base stations that lack backward compatibility with prior access technologies (e.g., 4G). In embodiments, the base station 212 may bi-directionally exchange information with neighboring base stations 220 and 222 through an X2 interface or X2 link. Information regarding signal quality, RF conditions, one or more RLFs, and SINR levels at each of the neighboring base stations 220 and 122, and/or as reported from UE to the neighboring base stations 220 and 122 may be communicated to the base station 212 via the X2 link. Additionally or alternatively, information regarding signal quality, RLFs, and SINR levels at each of the neighboring base stations 220 and 222 may be communicated to the base station 212 over the backhaul.

As mentioned, the base station 212 may include a radio and/or a controller, such as an MMU, that enables the base station 212 to adjust or modify the operations and transmissions of the plurality of antenna elements in the antenna array 216. In embodiments, the operations, configurations, and/or settings of each antenna element may be individually controlled and adjusted by the base station 212 using the controller. In some embodiments, the operations, configurations, and/or settings of the first portion of antenna elements may be controlled and adjusted as a group by the base station 212 using a controller, such as an MMU, independent of the second portion of antenna elements. In a similar fashion, the operations, configurations, and/or settings of the second portion of antenna elements may be controlled and adjusted as a group by the base station 212 using the controller, independent of the first portion of antenna elements. Accordingly, the base station 212 may use a controller to independently adjust different groups or portions of antenna elements within one antenna array.

In embodiments, the operations, configurations, and/or settings of each individual antenna element may be adjusted and customized. For example, the base station 212 instructs a portion of antenna elements to transmit one or more synchronization signals using a periodicity. In another example, the portion of antenna elements may transmit a plurality of synchronization signals using the periodicity, as instructed by the base station 212. The synchronization signals may be specific to and/or configured for the first access technology, in embodiments.

Accordingly, the base station 212 may use a controller to independently adjust different individual antenna elements, any number of groupings and/or subset(s) of each portion of antenna elements, and/or portions of antenna elements within one antenna array. In embodiments, the base station 212 may use a controller to measure and monitor one or more of throughput, signal quality metrics (e.g., SINR), a quantity of unique users/subscribers, a quantity of unique UE, and/or RLFs.

Figure 3:
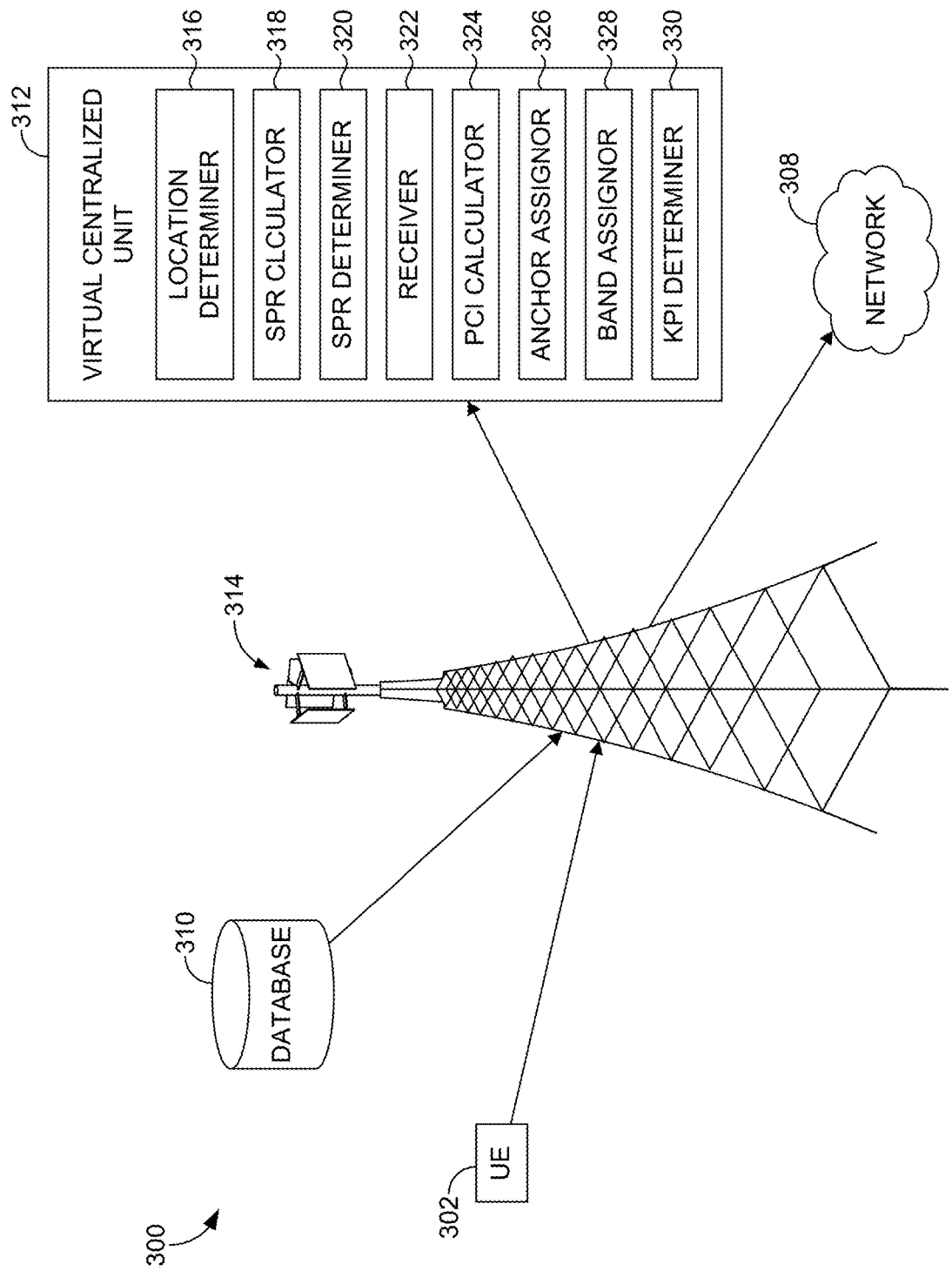
FIG. 3 illustrates a diagram of an exemplary network environment in which implementations of the present disclosure may be employed.

Turning now to FIG. 3, network environment 300 is an exemplary network environment in which implementations of the present disclosure may be employed. Network environment 300 is one example of a suitable network environment and is not intended to suggest any limitation as to the scope of use or functionality of the present disclosure. Neither should the network environment be interpreted as having any dependency or requirement relating to any one or combination of components illustrated.

Network environment 300 includes UE 302 (network environment 300 may contain more UEs), network 308, database 310, virtual centralized unit 312, and cell site 314. In the network environment 300, UE 302 may take on a variety of forms, such as a PC, a UE, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 314 in order to interact with network 308, which may be a public or a private network. While one UE 302 is shown in FIG. 3, UE 302 may be referred to as one or more UEs as it is contemplated that there may be multiple UEs present in other embodiments.

In some aspects, the UE 302 corresponds to a UE or a computing device. For example, the UE may include a display(s), a power source(s) (e.g., a battery), a data store(s), a speaker(s), memory, a buffer(s), a radio(s), and the like. In some implementations, the UE 302 comprises a wireless or mobile device with which a wireless telecommunication network(s) may be utilized for communication (e.g., voice and/or data communication). In this regard, the UE may be any mobile computing device that communicates by way of a wireless network, for example, a 3G, 4G, 5G, LTE, CDMA, or any other type of network.

In some cases, the UE 302 in network environment 300 may optionally utilize network 308 to communicate with other computing devices (e.g., a mobile device(s), a server (s), a personal computer(s), etc.) through cell site 314. The network 308 may be a telecommunications network(s), or a portion thereof. A telecommunications network might include an array of devices or components (e.g., one or more base stations), some of which are not shown. Those devices or components may form network environments similar to what is shown in FIG. 3 and may also perform methods in accordance with the present disclosure. Components such as terminals, links, and nodes (as well as other components) may provide connectivity in various implementations. Network 308 may include multiple networks, as well as being a network of networks, but is shown in more simple form so as to not obscure other aspects of the present disclosure.

Network 308 may be part of a telecommunication network that connects subscribers to their service provider. In aspects, the service provider may be a telecommunications service provider, an internet service provider, or any other similar service provider that provides at least one of voice telecommunications and data services to UE 302 and any other UEs. For example, network 308 may be associated with a telecommunications provider that provides services (e.g., LTE) to the UE 302. Additionally or alternatively, network 308 may provide voice, SMS, and/or data services to UEs or corresponding users that are registered or subscribed to utilize the services provided by a telecommunications provider. Network 308 may comprise any communication network providing voice, SMS, and/or data service(s), using any one or more communication protocols, such as a 1x circuit voice, a 3G network (e.g., CDMA, CDMA2000, WCDMA, GSM, UMTS), a 4G network (WiMAX, LTE, HSDPA), or a 5G network. The network 308 may also be, in whole or in part, or have characteristics of, a self-optimizing network.

In some implementations, cell site 314 is configured to communicate with the UE 302 that is located within the geographical area defined by a transmission range and/or receiving range of the radio antennas of cell site 314. The geographical area may be referred to as the "coverage area" of the cell site or simply the "cell," as used interchangeably hereinafter. Cell site 314 may include one or more base stations, base transmitter stations, radios, antennas, antenna arrays, power amplifiers, transmitters/receivers, digital signal processors, control electronics, GPS equipment, and the like. In particular, cell site 314 may be configured to wirelessly communicate with devices within a defined and limited geographical area. For the purposes of the present disclosure, it may be assumed that it is undesirable and unintended by the network 308 that the cell site 314 provide wireless connectivity to the UE 302 when the UE 302 is geographically situated outside of the cell associated with the cell site 314.

In an exemplary aspect, the cell site 314 comprises a base station that serves at least one sector of the cell associated with the cell site 314 and at least one transmit antenna for propagating a signal from the base station to one or more of the UE 302. In other aspects, the cell site 314 may comprise multiple base stations and/or multiple transmit antennas for each of the one or more base stations, any one or more of which may serve at least a portion of the cell. In some aspects, the cell site 314 may comprise one or more macro cells (providing wireless coverage for users within a large geographic area) or it may be a small cell (providing wireless coverage for users within a small geographic area). For example, macro cells may correspond to a coverage area having a of approximately 1-15 miles or more, the radius measured at ground level and extending outward from radius an antenna at the cell site. In another example, a small cell may correspond to a coverage area having a radius of approximately less than three miles, the radius measured at ground level and extending outward from an antenna at the cell site.

As shown, cell site 314 is in communication with the virtual centralized unit 312, which comprises a location determiner 316, SPR calculator 318, SPR determiner 320, receiver, 322, PCI calculator 324, anchor assignor 326, band assignor 328, and key performance indicator (KPI) determiner 330. The virtual centralized unit 312 may connect UE 302 and other UEs to frequency bands within range of the UE 302 or other UEs for access to network 308. The virtual centralized unit 312 may communicate with the database 310 for storing and retrieving data.

As discussed, the system 300 includes at least a first node and a second node (not shown in FIG. 3) that are configured to wirelessly communicate with one or more UEs within a geographic service area. As shown, cell site 314 comprises antenna array 340. Antenna array 340 may commutate via the first wireless protocol or the second wireless protocol with one or more UEs. In aspects, the first node utilizes a first wireless communication protocol and the second node utilizes a second communication protocol. The first wireless communication protocol is 5G and the second communication protocol is LTE. However, it is contemplated that the first wireless communication protocol may be LTE, 3G, and the like. Likewise, the second communication protocol may be 3G, 5G and the like.

Beginning with location determiner 316, the location determiner 316 may determine a location within a geographic area associated with one or more UEs, such as UE 302. Location information may comprise GPS or other satellite location services, terrestrial triangulation, an access point location, or any other means of obtaining coarse or fine location information. The location information may indicate geographic location(s) of one or more of a UE, an antenna, a cell tower, a cell site, and/or a coverage area of a cell site, for example. Once the location determiner 316 determines the location of UE 302, the location determiner 316 may determine whether or not UE 302 or any other UEs are in an undesired location. The determination by the location determiner 316 occurs by identifying the latitude and longitude of at least one or more UEs. A UE might be located in an undesired location when it falls within the undesired region (shown in FIG. 4). The undesired region is a region in which the SPR value is determined to be higher than a predetermined threshold. Likewise, if the location of the UE is in a durable region, then it is likely that SPR is low, and the virtual centralized unit 312 may not need to take any additional action.

Figure 4:
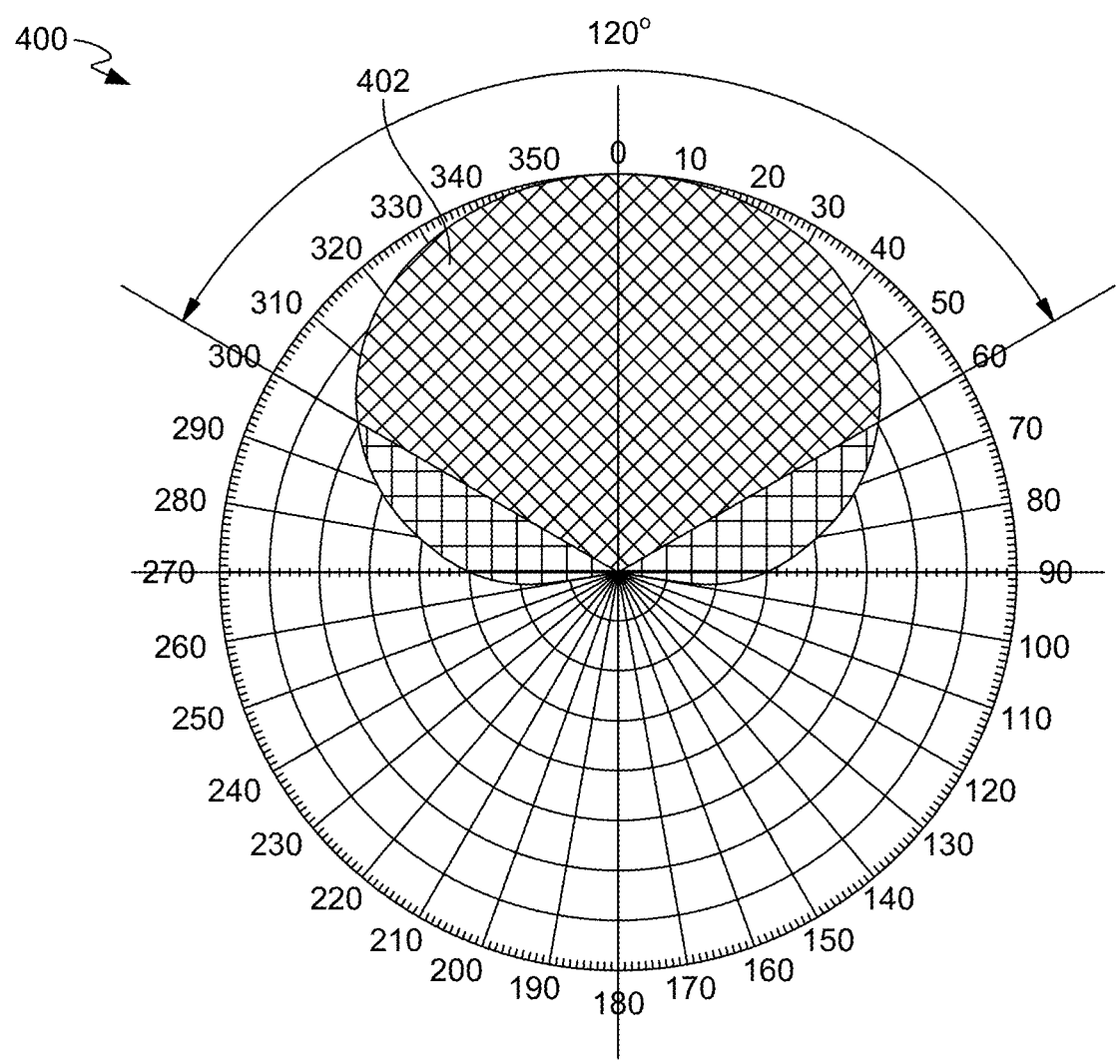
FIG. 4 depicts an exemplary schematic diagram illustrating the desired and undesired regions of SPR, in accordance with an embodiment of the present invention.

Referring to FIG. 4, SPR values that fall within the desired region 402 may be SPR values that fall below a certain predetermined threshold. For exemplary purposes only, the best performing antennas may provide SPRs of about 3-4%. As such, SPR values calculated that fall within the desired region 402 might include any SPR value that is below 4%. When a high SPR value is calculated (e.g. 8%), the SPR value falls within the undesired region 404. Only when the location determiner 316 determines that one or more UEs are within an undesired region, the SPR calculator 318 is triggered to calculate the SPR value for the first node, the second node, the first frequency band, and the second frequency band. By contrast, if the location determiner 316 determines that the location of one or more UEs is in the desired region 402, then no additional action is taken as this indicates a low SPR value.

The SPR calculator 318 is configured to calculate the SPR value for the first node and the second node, the determined SPR value expressing the RF power radiated outside the sector versus the RF power radiated and retained within the sector. As mentioned, SPR is a measure of an antenna's ability to minimize interference. SPR describes an RF power that is radiated outside of an antenna array's sector relative to an RF power that is radiated and retained within the antenna array's sector. Because SPR is a ratio, SPR may be represented using a percentage value or numerical value. An example of a low SPR value is 3-4%, and an example of a high SPR value is 8-10%. Antennas with greater spillover areas have greater SPR values. SPR information may be used for dynamically combatting interference and noise at a cell site. Additionally, the SPR values of cell site antennas may be used for selection and assignment of specific frequency bands to component carriers of UEs in a telecommunications environment.

Increased or high SPR values have negative impacts, which are exacerbated in LTE environments that allow and facilitate multiple frequency bands and carrier aggregation for combining multiple frequency bands for uplink and/or downlink communications. Negative impacts that high-powered, undesired RF radiation at a cell site causes may be reduced or mitigated by assigning a frequency band of low-SPR antennas to a primary component carrier of a UE. For example, a frequency band that corresponds to a low-SPR antenna may be assigned to the primary component carrier of an inter-carrier aggregation capable device that is geographically located at or near radio frequency "spillover" areas (i.e., radiation outside of an antenna's desired sector at a cell site) and which is experiencing lower throughput.

Additionally, SPR quantifies the power of RF radiation that is outside of the sector of an antenna relative to the power of the RF radiation radiated within the same sector of the same antenna. As such, the SPR represents the power of the undesired RF signal relative to the power of the desired RF signal, for a particular antenna. Accordingly, SPR is a measure of power and undesired RF radiation refers to an amount of power of the undesired RF radiation. Thus, as undesired RF spillover of an antenna increases, the SPR of the same antenna increases and vice versa, when all other factors are controlled. As undesired RF spillover and SPR increase, interference and noise increase at the cell site 314. Due to these measures, SPR may be used as a predictor, indictor, and/or measure of an antenna's likelihood of causing interference and noise, or actual causation of interference and noise. SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example.

Further, SPR for an antenna may be calculated using RF radiation patterns. For example, the SPR of the antenna accounts for the power of its undesired RF signal relative to the power of the desired RF signal. The SPR of the antenna quantifies the amount of power of the undesired RF radiation contributed by the antenna to areas relative to the amount of power of the desired RF radiation in a sector of the antenna. Due to spillover among various antennas, certain areas experience the presence of interference and noise.

Each wireless communication protocol may also have a frequency band assigned. For example, a first wireless protocol may be assigned a first frequency band while a second wireless protocol is assigned a second frequency band. Each of the first frequency band and the second frequency band are utilized for wireless communication with one or more UEs in the geographic area. For exemplary purposes only, the first frequency band may be band 41 and the second frequency band may be band 25. In addition to calculating the SPR of the cell site 314, the SPR calculator 318 also calculates the SPR of the first frequency band and the second frequency band.

Once the SPR calculator 318 determines the SPR value, the SPR determiner 320 determines that at least one of the first node and the second node has an SPR value above a predetermined threshold. In aspects, there may be more than a first and second node present, and as such, the SPR calculator 318 may calculate the SPR values for additional nodes. Each of the first node and the second node are configured to wirelessly communicate with one or more UEs in a geographic area. In some instances, the first node may utilize a 5G wireless communication protocol and the second node may utilize a LTE wireless communication protocol.

As mentioned, an example of low SPR value is 3-4%, while an example of high SPR value is 8-10%. As such, in aspects, the virtual centralized unit 312 may set a predetermined SPR threshold. For example, the virtual centralized unit 312 may determine that the predetermined SPR threshold is 5%. As such, any SPR calculations completed by the SPR calculator 318 that are above 5% will be determined by the SPR determiner to be above the predetermined threshold indicating an unfavorable situation. It is contemplated that the predetermined threshold may not be static, and instead may fluctuate based on, for example the network 308 or base station 314's requirements. Additionally, the SPR determiner 320 may determine that one or both the first node and the second node has an SPR value above the predetermined threshold.

In some embodiments, the first and second node that correspond to a first and second wireless communication protocol may have an SPR value that is less than an SPR value of another adjacent antenna at the cell site. SPR determiner 320 may also determine, in response to a determination that the wireless communication protocol has a high SPR, that a monitored KPI value has exceeded a threshold value. This determination may be based on an evaluation of the average throughput of the entire sector. The average sector throughput may exceed a pre-determined threshold by a particular magnitude determined by SPR determiner 320. Other KPI values monitored may be an individual UE throughput or the data usage for the sector.

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, the SPR determiner 320 may dynamically determine SPR values of antennas at the cell site when a UE enters the service coverage area of the cell site. Alternatively, SPR determiner 320 may determine SPR values of the antennas at the cell site periodically, the virtual centralized unit 312 storing the SPR values in the database 310 at the base station controlling the cell site 314. Stored SPR values may be referenced when a UE enters a service coverage area of the cell site 314. Additionally or alternatively, SPR values of the antennas at the cell site 314 may be determined for individual antennas when each antenna is installed at the cell site and stored in database 310 at the base station controlling the cell site 314. In this way, dynamically determined or periodically updated SPR values may be compared, for example, by the base station to an initial or installation SPR value so that the performance of each antenna can be monitored, for example.

Based upon the determination that at least one of the first node and the second node has an SPR value that is above a predetermined threshold (e.g. 5%), the receiver 322 may receive historical data for the first node and the second node. Such data may be received from a variety of sources, including but not limited to, the UE 302, the network 308, the database 310, and the cell site 314. This historical data received by receiver 322 includes a rate at which one or more UEs 302 connect to and disconnect from the first node and the second node during a predetermined time period.

In some embodiments, the receiver 322 may receive various information from UEs and from particular frequency bands. Additionally, data the receiver 322 may access includes, but is not limited to, location information of the UE 302 and channel quality information. Channel quality information may indicate the quality of communications between one or more UEs and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more UEs communicating with the cell site, observed SINR and/or signal strength at the UE(s), or throughput of the connection between the cell site and the UE(s). Location and channel quality information may take into account the UE's capability, such as the number of antennas of the UE and the type of receiver used by the UE for detection. The receiver 322 may also be configured to receive information from cell sites other than cell site 314 or other processors and/or servers.

PCI calculator 324 is configured to determine a PCI value for the first node and the second node based on the historical data received by receiver 322. PCI is defined as the identifier of a cell in the physical layer of a network, such as an LTE network, that is used for separation of different transmitters. As mentioned, PCI value is calculated as a percentage of frequency change of a UE over a period of time. As such, if the PCI frequency is changing frequently, but the UE is static (e.g. not moving), then the ping-pong effect is taking place and the UE is in one location but connecting and disconnecting from the node. If PCI value is changing frequently and it appears based on latitude and longitude of the UE that the UE is moving, then the ping-pong effect may be high. In aspects, the PCI calculator 324 may determine that the PCI value is above a predetermined threshold value. When the PCI value is high and there are high amounts of ping-ponging taking places, battery life is negatively impacted.

The PCI calculator 324 may then determine the PCI value for the first node and the second node. For example, the PCI calculator may calculate a high PCI (e.g. 5%) for the first node and a low PCI (e.g. 2%) for the second node. Based on the PCI determination, the anchor assignor 326 will assign the UE 302 to either the first node or the second node. The anchor assignor 326 will assign the UE 302 to the node which has the lower PCI value. As such, in the current example, anchor assignor 326 will assign the second node as the anchor node for UE 302 since the second node had a lower PCI value than the first node. It is contemplated that, one or more UEs, such as UE 302, located in the same coverage area will be assigned by the anchor assignor the same node.

The band assignor 328 will assign the one or more UEs 302 to the frequency band determined to have a lower SPR. Previously, a UE 302 would be assigned to the frequency band was closest to its location. For example, if UE 302 was located in a service area closest to band 41, the band assignor 328 would have assigned band 41 to UE 302. By contrast, in the aspect disclosed herein, based on the determined SPR value, the band assignor 328 will assign the band with the lower SPR value rather than based on location. For example, if the first node is comprised of band 41 and band 25 and band 25 has a better SPR value determined by SPR determiner 320 (i.e. lower SPR value—3-4%), the band assignor 328 will assign band 25 within the first node as the anchor band.

Additionally, in some aspects, the virtual centralized unit 312 may also include a KPI determiner 330. The KPI determiner 330 may detect that the first node has a high SPR value due to a high degree of interference and that the SPR value is above a predetermined threshold. Further, KPI determiner 330 may determine additional key performance indicators. For example, SPR determine may determine that the sector average throughput is lower than a selected threshold value. Furthermore, KPI determiner 330 may determine that the throughput for individual UEs utilizing the node, is lower than a threshold value, Further, SPR determiner may determine that the average data usage within the sector utilizing the first wireless communication protocol is higher than a threshold value. The threshold values for the sector throughput, the UE throughput, or the data usage may be determined by a network administrator or automatically selected based on desired performance of the sector.

Figure 5:
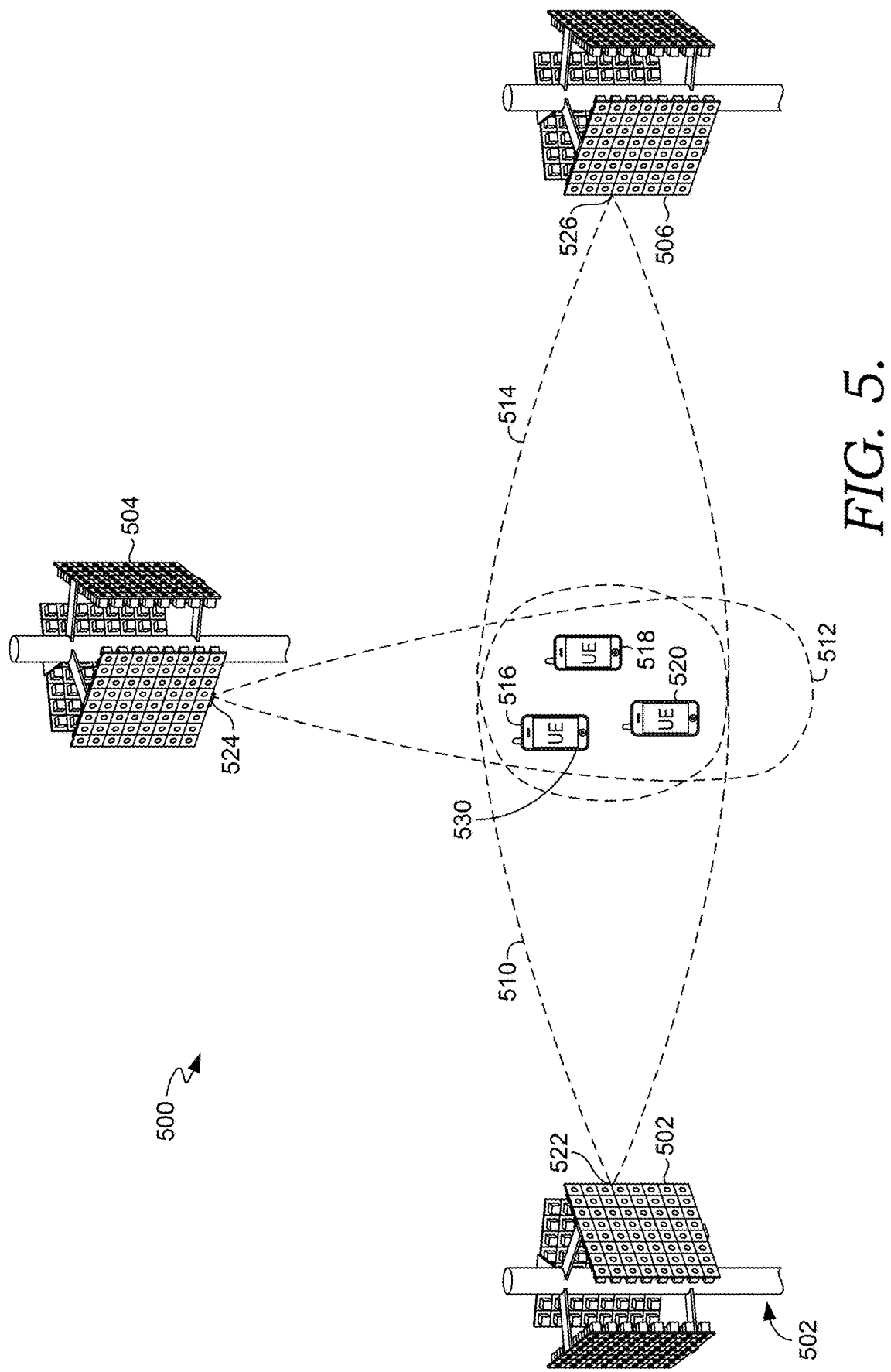
FIG. 5 depicts an exemplary environment with three cell sites having an overlapping coverage areas, wherein implementations of the present disclosure may be employed.

FIG. 5 illustrates an exemplary environment with three cell sites 502, 504, and 506 having overlapping coverage areas. Site 502 comprises a first antenna array 522, site 504 comprises a second antenna array 524, and site 506 comprises a third antenna array 526. In aspects, the one or more antennas may be dipole antennas, having a length, for example, of ¼, ½, 1, or 1½ wavelength. The first antenna 522 may be an active antenna array, FD-MIMO, massive MIMO, 3G, 4G, 5G, and/or 802.11. While we refer to dipole antennas herein, in other aspects, the one or more antenna arrays 522, 524, and 526 may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the first antenna array 502 may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, the first antenna array 522, second antenna array 524, and third antenna array 526 may comprise 64 antenna elements arranged in an 8×8 structure. In other aspects, the first antenna array 522, second antenna array 524, and third antenna array 526 may comprise antenna elements arranged in an 8×4, 4×8, or 4×4 configuration. Each antenna element of the first antenna array 522, second antenna array 524, and third antenna array 526 comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the first antenna array 522 may communicate or is capable of communicating with devices, using a 5G wireless communication protocol. The second antenna array 524 may communicate or is capable of communicating with devices, using a LTE communication protocol and the third antenna array 526 may communicate or be capable of communicating with devices using the 5G wireless communication protocol. While in this example 5G is mentioned as a wireless communication protocol, it should be understood that any wireless communication protocol standard may be utilized for example, 3G, 4G, LTE, 5G, 802.11, or any other operator-elected wireless communication protocol standard.

In the aspect depicted in FIG. 5, the first antenna array 522 can include 64 antenna elements each with a distinct direction which may be known, and where each antenna element is capable of communicating with UEs, e.g., using one or more specific beams, each identifiable as a beam index, as referred to herein, in aspects. In the same or alternative aspects, a UE may communicate with more than one antenna element of the first antenna array 522. In aspects, using the methods and systems disclosed herein with a high-density antenna array, such as the first antenna array 522, and using a 5G wireless communication protocol as an example, can facilitate the strategic assignment of beam indices and/or allotment of beam indices tailored for a specific purpose or environment. The second antenna array 524 and third antenna array 526 may be configured similarly first antenna array 522.

As shown, the first antenna array 522 generates a service beam 510 that covers a portion of a service area. Likewise, the second antenna array 524 also generates a service beam 512 and the third antenna array 526 generates a third service beam 514. Each service beam 510, 512, and 514 corresponds to a radiation pattern of a corresponding sites 502, 504, and 506. The shape, size, and dimension(s) of the service coverage area of each site 502, 504, and 506 are, generally, determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each antennas. Each antenna wirelessly receives and transmits RF transmissions to and from, for example, user equipment, other antennas, other cell sites, base stations, and/or satellites, in order to facilitate communications between such devices.

In some embodiments, the location determiner 316, in communication with the sites 502, 504, and 506, may detect when a UE, such as UE 516, enters an area covered by one or more antenna elements of an antenna array, e.g., the first antenna array 522 of the site 502 of FIG. 5. In some embodiments, UEs may detect and/or measure one or more signals, e.g., synchronizations signals, from the antenna array when entering an area covered by the one or more antenna elements of the antenna array.

The coverage area of the three sites 502, 504, and 506 overlap in area 530. For exemplary purposes service beam 510 may be an LTE service beam while service beams 512 and 514 may be 5G service beams. Historically, UE's 516, 518, and 520 would have automatically attached to the LTE service beam 510 of antenna array 522 and then added 5G via either site 504 or site 506. By contrast, in the present aspect, the UE will by dynamically assigned to the node with the lower SPR and PCI values. For example, if site 1 has a calculated SPR value of 7% and a higher PCI determination and site 504 has a low SPR value of 3% and a low PCI value indicating less ping-pong effect, then the anchor assignor 326 will assign site 504 as the anchor for UEs 516, 518, and 530.

Figure 6:
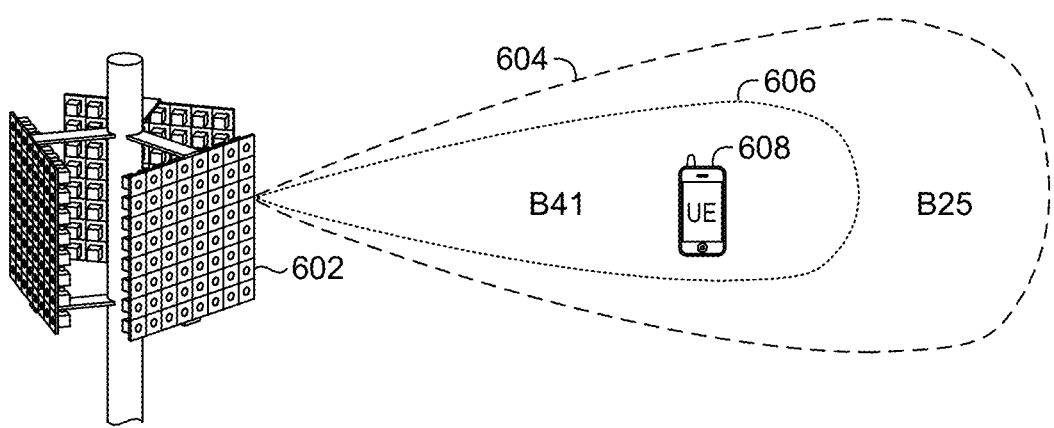
FIG. 6 depicts an exemplary environment with a single cell site, wherein implementations of the present disclose may be employed.

Next, FIG. 6 illustrates an exemplary environment with a single cell site, where implementations of the present disclosure may be employed. As shown in FIG. 6, site 602 is emitting two service beams —604 and 606 and UE 608 is within the coverage area of both the first beam 604 and the second beam 606. In this aspect, the UE 608 has already been assigned the site 602 by the anchor assignor 326. Now, the band assignor 328 must assign UE 608 to the frequency band determined to have the lower SPR value. For example, anchor assignor 326 has assigned UE 608 to site 602 (other potential anchor sites are not shown in FIG. 6) based on the determination that site 602 had a lower PCI value than other available anchor sites.

In this scenario, the node assigned may utilize a 5G wireless communication protocol. However, in other aspects, other communication protocols including LTE, 3G and the like may be assigned. Previously, UE 608 would have been assigned to whichever band was closed to its location without consideration of SPR and interference issues. As such, the UE 608 could be assigned to either band 41 or band 25 because UE 608 falls within the service area for both the second beam 606 which includes band 41 and the first beam 604 which includes band 25. However, previously, if UE 608 moved outside the area of the second beam 606 and into the area only covered by first beam 604, only band 25 would be available for assignment by the band assignor. This limitation did not allow for the most optimal wireless communication session.

The present disclosure is aimed at trying to resolve such issues by taking SPR values into account. Relying on the SPR determinations for the first frequency band and the second frequency band, the band assignor 328 may assign the frequency band with the lower or better SPR value, regardless of whether the that frequency band is the closest frequency band to the location of the UE 608. Therefore, UE 608 could be assigned to band 41, even if UE 608 was not located within the second beam 606 where band 41 is. In aspects, the band assignor 328 assigns the frequency band based on which frequency has a lower SPR value. The frequency band assigned will be based on the SPR determined by SPR determiner 320. For example, if SPR determiner determines that the SPR value is 2% for band 41 and 5% for band 25, the band assignor 328 will assign UE 608 to band 41. By contrast, if the SPR determiners that band 25 has a better (e.g. lower percentage) SPR value, then band assignor would assign band 25 for UE 608. By taking SPR values into consideration, the system is able to provide a better wireless communication with less interference, better signal quality, and more effectively utilize resources such as battery life.

Figure 7:
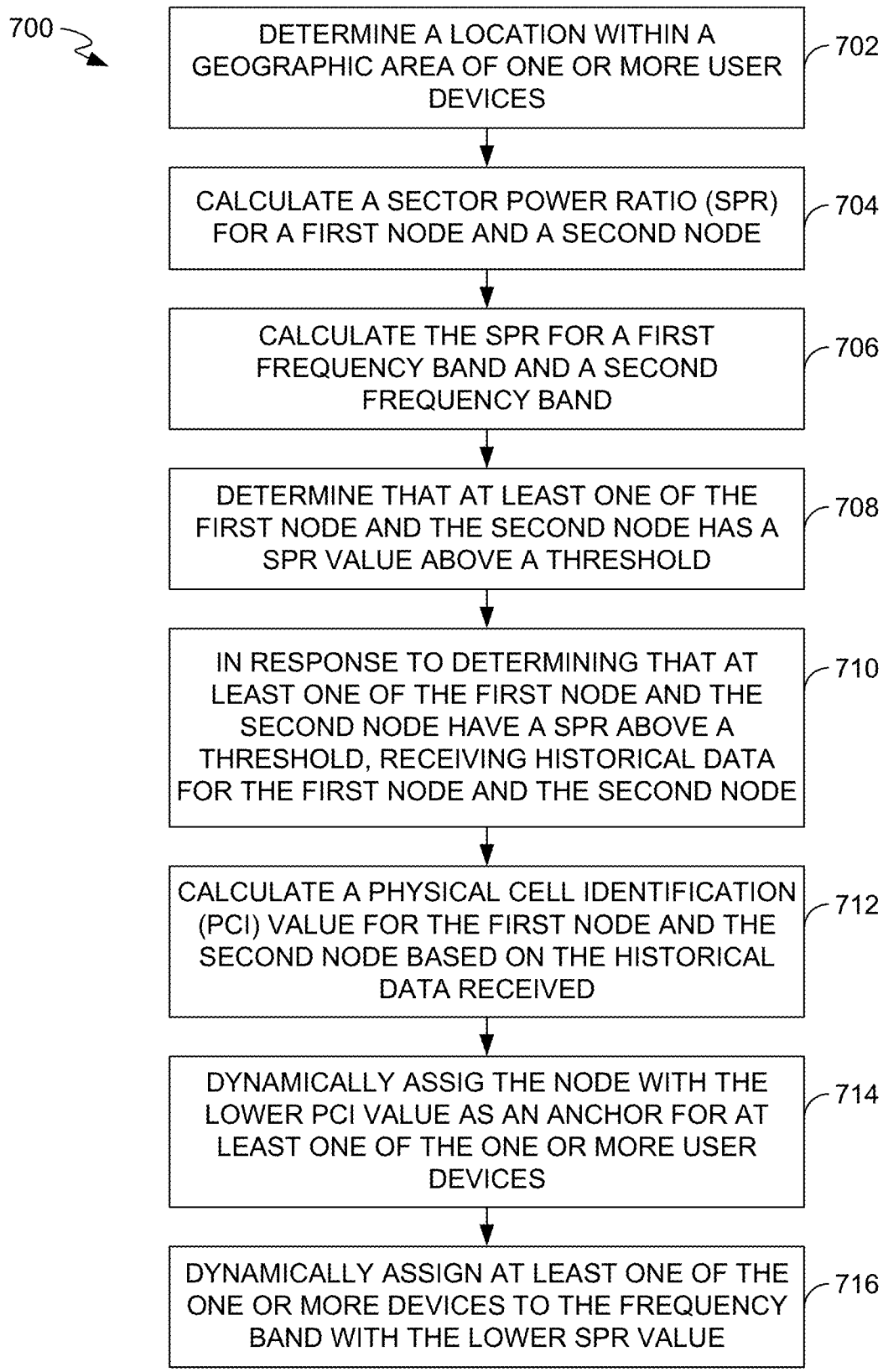
FIG. 7 depicts an exemplary method, in accordance with an embodiment of the present invention.

FIG. 7 illustrates an exemplary flow diagram 700 comprising an exemplary method for dynamically determining an anchor assignment for one or more UEs. Initially at block 702, a location within a geographic area for one or more UEs is determined by location determiner 316. Then, the SPR calculator 318 calculates a SPR value for a first node and a second node at block 704. Additionally, the SPR calculator 318 also calculates the SPR for a first frequency band and a second frequency band at block 706. The SPR determiner 320 then determines that at least one of the first node and the second node have an SPR value above a threshold at block 708. In response to determining that the first node and the second node have an SPR value above a threshold, the receiver 322 receives historical data for the first node and the second node at block 710. Following this, the PCI calculator 324 will calculate a PCI value for the first node and the second node based on the historical data received at block 712. The anchor assignor 326 will assign the node with the lower PCI value as an anchor for at least one or more of the UEs at block 714. After that, the band assignor 328 will assign at least UEs to the frequency band with the lower SPR value.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A system for dynamically determining an anchor assignment for one or more UEs, the system comprising:
    at least a first node and a second node, each of the first node and the second node are configured to wirelessly communicate with one or more UEs in a geographic service area; and
    one or more processors configured to perform operations comprising:
        determine a sector power ratio (SPR) value for the first node and the second node;
        determine that at least one of the first node or the second node has an SPR value above a predetermined threshold;
        in response to determining that the SPR value is above the predetermined threshold for at least one of the first node or the second node, receive historical data for the first node and the second node;
        determine a physical cell identification (PCI) value for the first node and the second node based on the historical data received; and
        assign the node with a lower PCI value as an anchor for the one or more UEs.

2. The system of claim 1, wherein the first node utilizes a first wireless communication protocol for communicating with the one or more UEs.

3. The system of claim 2, wherein the first wireless communication protocol is 5G.

4. The system of claim 1, wherein the second node utilizes a second wireless communication protocol for communicating with the one or more UEs.

5. The system of claim 4, wherein the second wireless communication protocol is LTE.

6. The system of claim 1, wherein the one or more processors are further configured to:
    determine that at least one of the one or more of the UEs are located in an undesired region;
    determine that at least a first frequency band and a second frequency band are utilized within the undesired region;
    determine a SPR value for the first frequency band and the second frequency band;
    determine which of the first frequency band and the second frequency band has a lower SPR value; and
    assign the at least one of the one or more UEs to the frequency band with the lower SPR value.

7. The system of claim 6, wherein the system determines that at least one of the one or more UEs are located in the undesired region by determining a latitude and a longitude of at least one of the one or more UEs.

8. The system of claim 6, wherein the frequency band is assigned to the first wireless communication protocol.

9. The system of claim 6, wherein the frequency band is assigned to the second wireless communication protocol.

10. The system of claim 1, wherein the historical data received comprises a rate at which the one or more UEs are connected to and disconnected from the first node and the second node.

11. A system for dynamically determining an anchor assignment for one or more UEs, the system comprising:
    at least a first node and a second node, each of the first node and the second node are configured to wirelessly communicate with one or more UEs in a geographic service area;
    a first frequency band assigned to a first wireless communication protocol and a second frequency band associated with a second wireless communication protocol, each of the first frequency band and the second frequency band utilized for wireless communication with the one or more UEs in the geographic service area; and
    one or more processors configured to perform operations comprising:
        determine a location within the geographic service area associated with the one or more UEs;
        determine that at least one of the one or more UEs is in an undesired region;
        calculate a sector power ratio (SPR) value for the first node and the second node;
        calculate an SPR value for the first frequency band and the second frequency band;
        determine that at least one of the first node and the second node has a SPR value above a threshold;
        in response to determining that at least one of the first node and the second node has the SPR value above the threshold, receive historical data for the first node and the second node;
        calculate a physical cell identification (PCI) value for the first node and the second node based on the historical data received;
        dynamically assign the node with a lower PCI value as an anchor for at least one of the one or more UEs; and
        dynamically assign at least one of the one or more UEs to the frequency band with a lower SPR value.

12. The system of claim 11, wherein the first node utilizes a 5G wireless communication protocol.

13. The system of claim 11, wherein the second node utilizes a LTE wireless communication protocol.

14. The system of claim 11, wherein the PCI value determined for at least one of the first node and the second node is above a predetermined threshold value.

15. The system of claim 11, wherein the first frequency band is a n41 band on the 5G wireless communication protocol and the second frequency band is band 25 on the LTE wireless communication protocol.

16. The system of claim 11, wherein the system determines a low SPR value for at least one of the first node and the second node.

17. The system of claim 11, wherein the historical data received comprises a rate at which the one or more UEs are connected to and disconnected from the first node and the second node during a predetermined time period.

18. A method for dynamically determining anchor assignment for one or more UEs, the method comprising:
    determining a location within a geographic area of one or more UEs;

calculating a sector power ratio (SPR) value for a first node and a second node;
calculating the SPR value for a first frequency band and a second frequency band;
determining that at least one of the first node and the second node has a SPR value above a threshold;
in response to determining that the SPR value for at least one of the first node and the second node is above the threshold, receiving historical data for the first node and the second node;
calculating a physical cell identification (PCI) value for the first node and the second node based on the historical data received;
dynamically assigning the node with a lower PCI value as an anchor for at least one of the one or more UEs; and
dynamically assigning at least one of the one or more UEs to the frequency band with a lower SPR value.

19. The method of claim 18, further comprising determining that at least one of the one or more UEs is located in an undesired region.

20. The method of claim 19, further comprising determining that the first frequency band and the second frequency band are located within the undesired region.

* * * * *